United States Patent
Jiang et al.

(10) Patent No.: US 7,395,457 B2
(45) Date of Patent: Jul. 1, 2008

(54) SYSTEM AND METHOD FOR DETECTING FAULTS IN A SYSTEM

(75) Inventors: Guofei Jiang, Princeton, NJ (US); Haifeng Chen, Plainsboro, NJ (US); Cristian Ungureanu, Princeton, NJ (US); Kenji Yoshihira, Cranford, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 636 days.

(21) Appl. No.: 11/149,655

(22) Filed: Jun. 10, 2005

(65) Prior Publication Data
US 2006/0282708 A1    Dec. 14, 2006

(51) Int. Cl.
*G06F 11/00* (2006.01)
(52) U.S. Cl. .................................................. 714/45
(58) Field of Classification Search ............... 714/45, 714/37, 39, 43, 25
See application file for complete search history.

(56) References Cited

U.S. PATENT DOCUMENTS

| 5,699,402 | A  | * | 12/1997 | Bauer et al. | 379/29.09 |
| 6,470,388 | B1 | * | 10/2002 | Niemi et al. | 709/224 |
| 6,654,915 | B1 | * | 11/2003 | Lu et al. | 714/57 |

OTHER PUBLICATIONS

M. Chen, et al., "Pinpoint: Problem Determination in Large, Dynamic Internet Services", Computer Science Division, University of California, Berkeley, International Conference on Dependable Systems and Networks (IPDS Track), 2002.

\* cited by examiner

*Primary Examiner*—Nadeem Iqbal

(57) ABSTRACT

To determine the cause of a problem, evaluating and tracing how an individual request traverses through various components in the system makes possible new detection techniques. The present invention relates to detecting faults in a computer system. In accordance with an embodiment of the invention, a method and apparatus detects a fault in a system by receiving a request and generating a trace based on the request. The trace is a sequence of components used to service the request. The method and apparatus also compares the trace with a stored automaton to determine whether the trace is an anomaly. The stored automaton describes traces.

28 Claims, 9 Drawing Sheets

FIG. 5

500 N-gram defining algorithm

The Set of Unique Traces 504 →

Initialize:
$C_1 = \{$the set of single components $c_1^i$ with $f(c_1^i) > 0\}$.
k=1
do {
  for each two elements $c_k^i$, $c_k^j$ from the set $C_k$ {
    if the last k-1 component sequence of $c_k^i$ equals the first k-1 component sequence of $c_k^j$
    then {
      1. generate a new sequence $s = c_k^i$ + the last component of $c_k^j$;
      2. count f(s), i.e., the number of times that s appears in the trace data;
      3. if $f(s) > \alpha * \min(f(c_k^i), f(c_k^j))$, then put s into the set $C_{k+1}$}}
  k=k+1}
while $C_k$ is not empty.

→ Sets of varied length N-grams, $C_k$ 506

502 Fault Detection Module

Traces: ABCDE, CDEA, and CDEBA
Threshold: 0.6

SYSTEM AND METHOD FOR DETECTING FAULTS IN A SYSTEM

BACKGROUND OF THE INVENTION

The present invention relates generally to detecting faults, and more particularly to detecting faults of a computer system based on user requests.

Over the past few decades, the Internet service has become extremely popular. On-line searching, shopping, and transactions have become part of people's lives. Behind popular web sites are typically large, dynamic and distributed systems that may consist of many components such as servers, software, and networking and storage equipment.

While the components themselves are often complicated, the dynamic interaction between these components introduces another level of complexity. Additionally, new software and hardware components are added to these systems as new functionalities are added.

Further, Internet services may receive a large number of user requests on a daily basis. These requests behave like probes into the system. In particular, these requests often test various parts of the system in a brute force manner by causing the system parts to work together to service the request. These requests are conventionally serviced by a sequence of components (e.g., an enterprise JavaBean, a Servlet, etc.) of the system. A fault or bug in the system could affect the operation of the sequence of components used to service the user requests.

Detection and diagnosis of faults in such a system has traditionally been, and continues to be, a formidable challenge. One approach to fault detection is based on event correlation. Event correlation typically involves monitoring networks and other systems in order to identify patterns of events that might signify a fault or risk to the system. Most event correlation systems (and other root cause analysis techniques) are based on static dependency models describing the relationships among the hardware and software components in the system. These dependency models may be used to determine which components might be responsible for a given problem. One limitation of traditional dependency models is the difficulty of generating and maintaining an accurate model of a constantly evolving Internet service. Another limitation is that it is often difficult to construct fault-symptom (patterns of events) mapping relationships in a large and complex system. In general, such a relationship is often system-dependent and cannot easily be generalized across different systems.

SUMMARY OF THE INVENTION

The present invention relates to detecting faults in a computer system by evaluating and tracing how an individual request traverses through various components in the system. In accordance with an embodiment of the invention, a method and apparatus detects a fault in a system by receiving a request and generating a trace based on the request. The trace is a sequence of components used to service the request. The method and apparatus also compares the trace with a stored automaton to determine whether the trace is abnormal (i.e., an anomaly). The stored automaton describes traces.

In one embodiment, the stored automaton consists of so-called N-grams and zero or more edges linking the N-grams. An N-gram is a subset of component sequences and order information regarding the subset of component sequences. The subset of component sequences are occurring more than a predetermined number of times in a trace. To determine whether the trace is an anomaly, the comparison may include determining whether N-grams exist in the automaton to form the trace. Moreover, the comparison may also include determining whether at least one path exists to link the N-grams together to form the trace. The trace is an anomaly if the trace cannot be formed by the automaton. The stored automaton describes prior traces.

In accordance with one embodiment of the present invention, a method and apparatus detects a fault in a computer system by storing traces in a memory. The method and apparatus also generates an automaton using at least one subset of component sequences. The automaton is then stored in the memory.

The method and apparatus can also define at least one subset of component sequences from the traces. The subset(s) of component sequences used to generate the automaton occurs more than a predetermined threshold number of times in the traces. Further, the length of component sequences in the subset can be controlled by this predetermined threshold. The generating of the automaton further includes adding edges between the component sequences. When a new user request is received, a new trace based on the user request is generated. To determine whether this new trace is an anomaly, the new trace is compared with the automaton.

These and other advantages of the invention will be apparent to those of ordinary skill in the art by reference to the following detailed description and the accompanying drawings.

BRIEF DESCRIPTION OF THE DRAWINGS

FIG. 5 shows a block diagram of a fault detection module executing an N-gram extraction algorithm in accordance with an embodiment of the invention;

DETAILED DESCRIPTION

Figure 1:
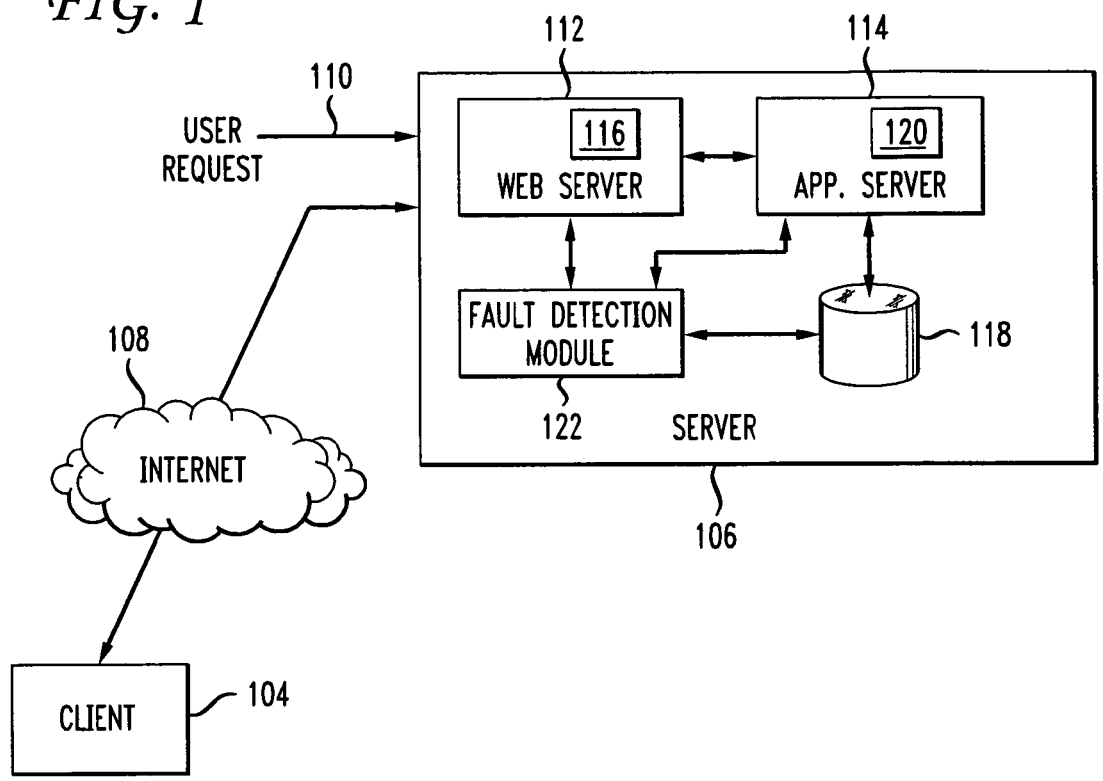
FIG. 1 shows a high level block diagram of a server receiving user requests from a client over a network in accordance with an embodiment of the invention.

FIG. 1 shows a high level block diagram of a server providing Internet services to a client over a network in accordance with the principles of the present invention. Further details regarding particular embodiments of the invention will be described in further detail in connection with FIGS. 2-10. In particular, FIG. 1 shows a client 104 communicating with a server 106 over a network 108 such as the Internet. The server 106 can be providing web services such as a web site over the network 108. For example, the server 106 may be hosting a web site and the client 104 can access the web site. In particular, the user of the client 104 accesses the web site and then communicates a user request 110 to the server 106.

The server 106 contains components used to service user requests. A component is a reusable program building block that can be combined with other components in the same or other computers in a distributed network to form an application. For example, the server 106 may contain a web server 112 to provide web pages to the client 104. The web server 112 may contain one or more software components 116 (e.g., JavaBeans) to perform one or more functions associated with the serving of the web page. For example, in an e-commerce application, the web server 112 may have separate components 116 to handle a user's check-in to the web site, checkout of the site, and payment.

As described in more detail below, a trace is a sequence of components used to service a user request. In particular, a trace includes a list of components' names as well as the sequential order of the components executed to service the request. This component sequence order includes both the local order constraints (i.e., the requirement that two components are adjacent to each other) and the global order constraints (i.e., the order relationship between nonconsecutive components). For example, in a trace ABCDEFG, the constraint that components A and B are consecutive components is a local order constraint while the constraint that components E and A are three steps apart is a global order constraint.

The server 106 also includes an application server 114. The application server 114 handles all application operations between the client 104 and a database 118. The application server 114 may 1) have built-in redundancy, may 2) monitor for high-availability, high-performance, distributed application services, and may 3) support access of the database 118. The application server 114 may also have one or more components 120 to handle the application operations. Each component 120 may perform one or more operations or functions associated with an application, such as a calculation, data lookup, etc.

The server 106 also includes a fault-detection module 122. The fault-detection module 122 communicates with the web server 112, the application server 114, and the database 118 to detect faults within the server 106. The fault detection module 122 may also communicate with the components (e.g., component 116 and 120) executing within each server component (e.g., web server 112 and application server 114, respectively).

Figure 2:
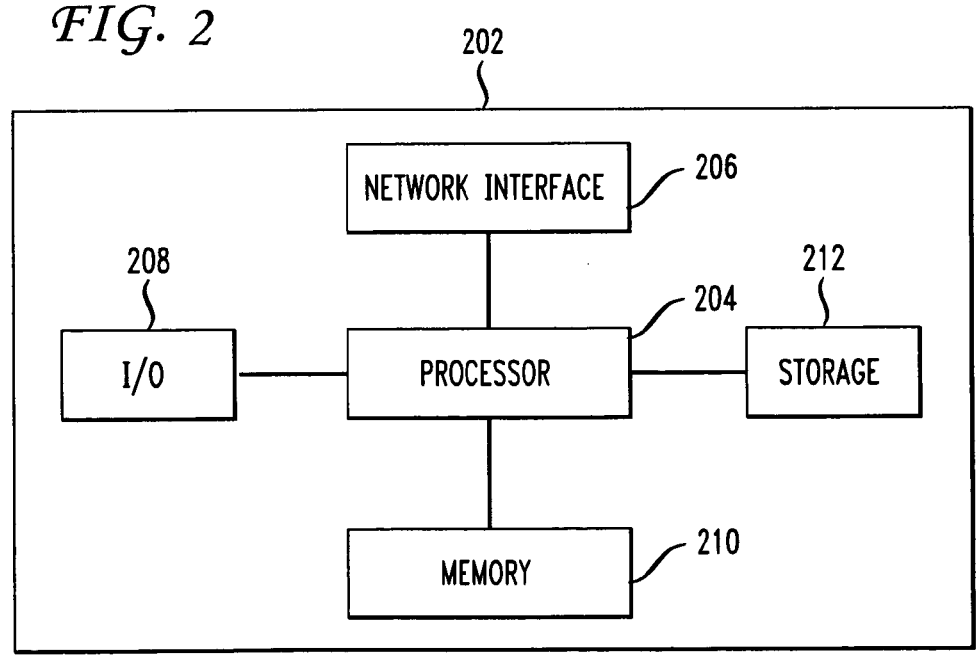
FIG. 2 shows a high level block diagram of the server which may be used in an embodiment of the invention.

A high level block diagram of a computer implementation of server 106 is shown in FIG. 2. Server 202 contains a processor 204 which controls the overall operation of the computer by executing computer program instructions which define such operation. The computer program instructions may be stored in a storage device 212 (e.g., magnetic disk) and loaded into memory 210 when execution of the computer program instructions is desired. Thus, the authentication server operation will be defined by computer program instructions stored in memory 210 and/or storage 212 and the computer will be controlled by processor 204 executing the computer program instructions. Server 202 also includes one or more network interfaces 206 for communicating with other devices via a network. Server 202 also includes input/output 208 which represents devices which allow for user interaction with the server 202 (e.g., display, keyboard, mouse, speakers, buttons, etc.). One skilled in the art will recognize that an implementation of an actual computer will contain other components as well, and that FIG. 2 is a high level representation of some of the components of such a computer for illustrative purposes.

Figure 3:
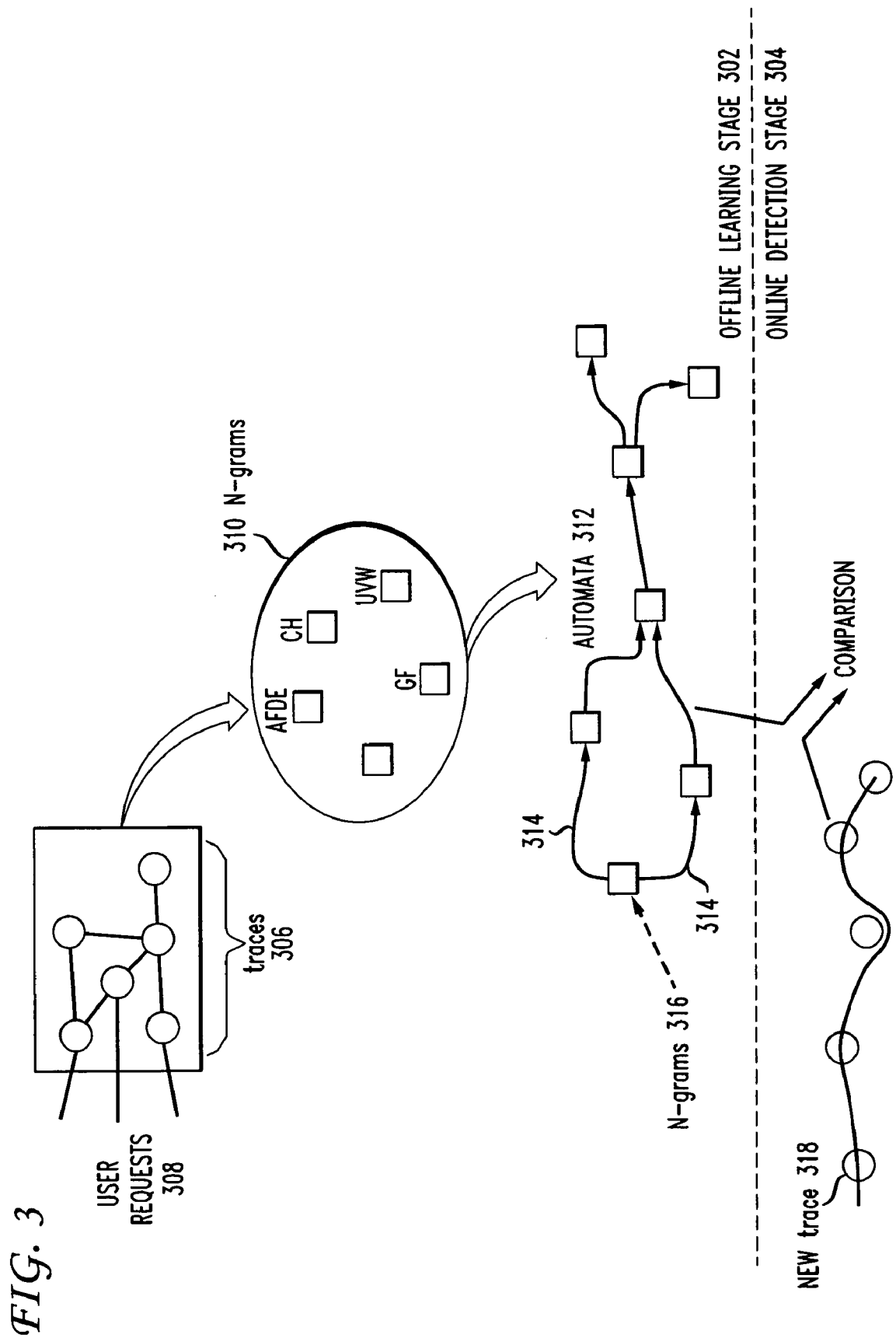
FIG. 3 shows a high level block diagram of the steps performed to detect abnormal traces in accordance with an embodiment of the invention.
Figure 4:
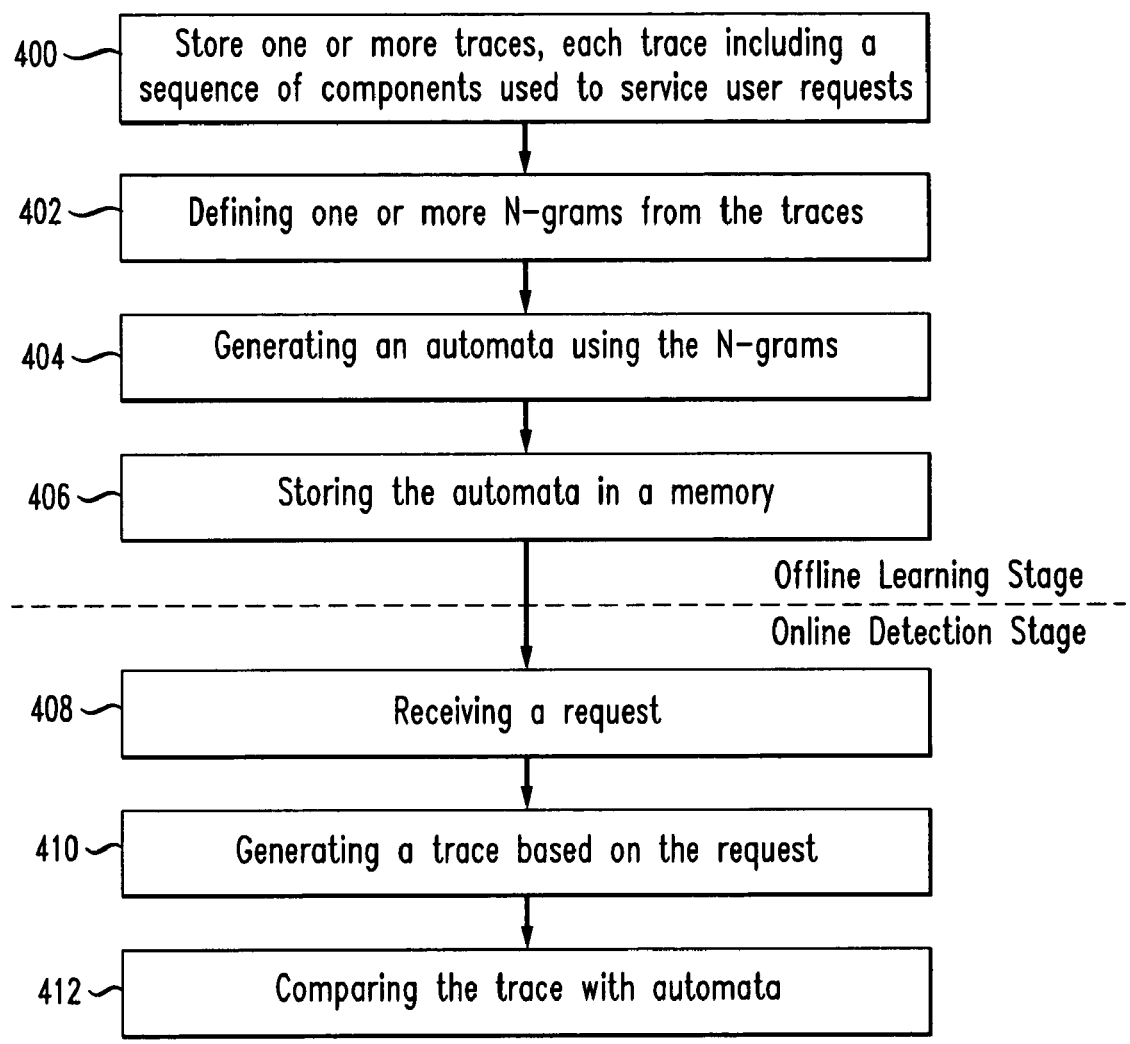
FIG. 4 is a flow chart of the steps performed to detect abnormal traces in accordance with an embodiment of the invention.

FIG. 3 is a block diagram illustrating the method used by fault detection module 122 to detect abnormal traces in a system. FIG. 4 shows a flow chart representing the steps performed by the fault detection module 122 in order to detect an abnormal trace in the system. The fault detection module 122 detects abnormal traces in two stages—an offline learning stage 302 and an online detection stage 304.

The fault detection module 122 obtains and stores traces 306 of user requests 308, the traces 306 also referred to below as a training set, in step 400. As described above, each trace is the sequence of system components (e.g., an enterprise JavaBean, a Servlet, etc.) that are used in servicing a user request.

The fault detection module 122 then defines in step 402 one or more subsets of frequently occurring (i.e., present more than a predetermined threshold number of times) component sequences (each subset is also referred to below and in FIG. 4 as an N-gram) from the traces in the training set. Thus, an N-gram includes a subset of component sequences and order information regarding the subset of component sequences. FIG. 5 illustrates the algorithm 500 that the fault detection module performs to define N-grams 506 from training set 504.

The algorithm 500 is an iterative process to determine the longest possible N-grams 506 that are present in the training set. In particular, fault detection module 502 begins from individual components (uni-grams) and merges two k-length N-grams to produce one (k+1)-gram, as long as its frequency exceeds the threshold α times the frequency of the parent k-grams (i.e., the k-grams that the current (k+1)-gram was derived from). Note that $0<\alpha<1$. In the case where the frequency of the child N-gram is equal to that of the parent N-gram, we can eliminate the parent N-gram from the set (in other words, longer N-grams subsume shorter N-grams). For example, assume that the algorithm 500 determines that N-gram AB is present three times in the training set. Also assume that N-gram ABC is present three times in the training set. The algorithm 500 determines that N-gram ABC subsumes N-gram AB because each appears three times in the training set. Thus, the fault detection module 502 determines that AB should not be kept as an N-gram but, in this example, retains ABC as an N-gram. If the sequence ABC appeared two times instead of three times, however, both AB and ABC would be kept in the N-gram pool.

In the N-gram defining algorithm 500, the fault detection module 502 begins the iterative process at an N-gram length of k=1 (i.e., the algorithm 500 is determining how many times a single component (e.g., A) appears in a trace (e.g., ABCDEFG). The fault detection module 502 initializes a set $C_I$ as a set of single components $c_I^i$. For each two elements $c_k^i$, $c_k^j$ from the set $C_k$, if the last k−1 component sequence of $c_k^i$ is equal to the first k-1 component sequence of $c_k^j$, the fault detection module 502 then generates a new sequence $s=c_k^j+$ the last component of $c_k^j$. The fault detection module 502 then counts the number of times that the new sequence appears in the training set 504. The fault detection module 502 then determines if the number of times that the new sequence s appears in the trace data is greater than the predetermined threshold: α times the frequency of the parent k-grams $c_k^i$ and $c_k^j$, then the new sequence s is placed into the set $C_{k+I}$. The fault detection module then adds one to the length of the N-gram and continues while $C_k$ is not empty.

Thus, with respect to FIG. 3, the fault detection module 122 receives traces 306 as input and extracts N-grams 310 from the traces 306 using the above algorithm. Note that the threshold α controls the length of the varied-length N-grams resulting from the above algorithm.

Figure 6:
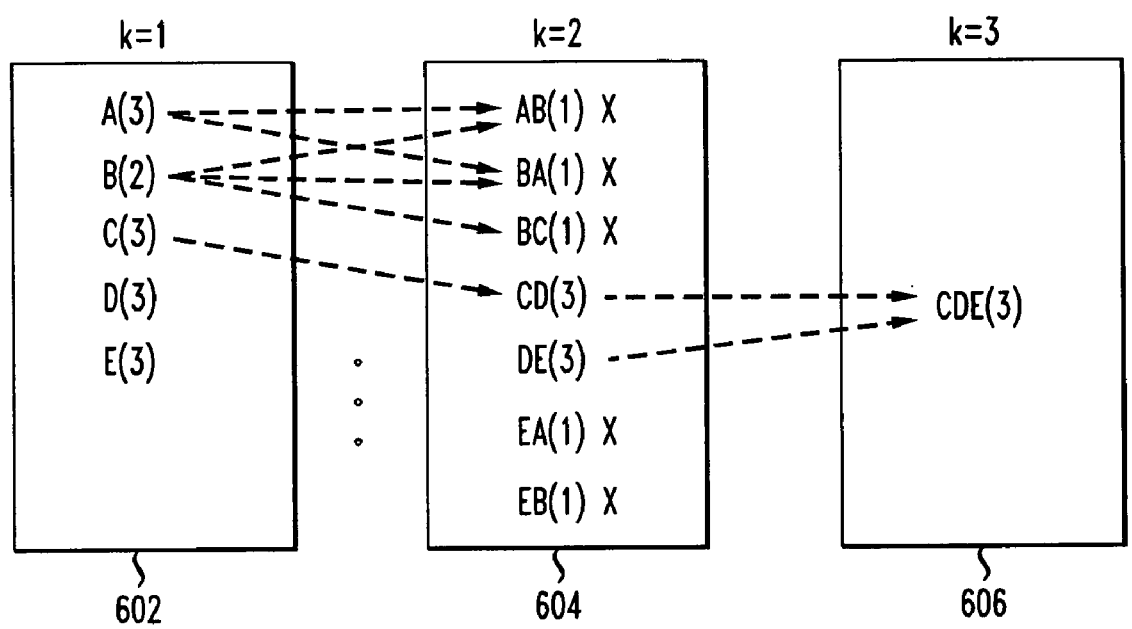
FIG. 6 shows a block diagram of an example of an N-gram extraction process in accordance with an embodiment of the invention.

An example of the N-gram defining / extraction process is illustrated in FIG. 6. Assume that the fault detection module 122 receives three traces, ABCDE, CDEA and CDEBA, and the threshold α is set to 0.6. The fault detection module 122 builds the N-grams by increasing the length k of components iteratively. Thus, FIG. 6 shows an example of the fault detection module defining an N-gram by increasing the length k of the components from k=1 (box 602) to k=3 (box 606). The number in the parenthetical (next to the component sequence) is the number of times that the associated sequence appears in the traces. Thus, at k=1, A appears three times in the three traces (i.e., ABCDE, CDEA, and CDEBA) while B appears twice. At k=2, the combined sequence with marked Xs appear less frequently than the required threshold α (i.e., they are present less than 60% of the frequency of their parents). In other words, the sequence AB only appears once in the three traces and so appears less than 60% of the frequency of its parents A and B (i.e., f(AB)=1 <0.6 min (f(A)=3, f(B)=2)). The fault detection module 122 does not, therefore, select these sequences as an N-gram. Thus, only sequences CD and DE are put into the set $C_2$ (i.e., k=2 as described above). In this example, the extraction process ends at k=3 and the length of the longest N-grams, therefore, is three. Further, CDE subsumes C, D, and E at k=1 and CD and DE at k=2 because CDE appears the same number of times (i.e., 3) as these other sequences.

Referring again to FIGS. 3 and 4, after the fault detection module 122 defines the N-grams 310, the fault detection module 122 generates an automata 312. The automata 312 models the traces 306 graphically using the N-grams 310 in step 404. In particular, the automata 312 is made up of the N-grams 310. The N-grams 310 in the automata 312 are connected by edges 314, or links between N-grams. One or more of the automata's N-grams 316 and edges 314 are used to model the traces 306. Thus, the automata 312 can be used to form traces 306. In particular, different paths along the automata 312 form different traces (via different N-grams 316 and different edges 314). An example of this is described below with respect to FIG. 8 with N-grams from FIG. 6 and the three traces mentioned above.

In step 406, the fault detection module 122 stores the automata 312 (i.e., model traces) in a memory of the server 106. The memory may be any type of memory, such as Random Access Memory (RAM), Read-Only Memory (ROM), etc.

The automata 312 (i.e., the algorithm used to generate the automata 312) selects N-grams 316 from the traces 306 by an algorithm that follows these two rules:

Rule 1) Choose the longest possible N-grams

Rule 2) From a set of equally long N-grams, the automata 312 selects the one occurring most often. The automata 312 (i.e., algorithm) decides remaining ties with a fixed but arbitrary order. N-grams 310 replace sub-sequences of the trace 306 until the trace 306 consists of N-grams 310 only. Below, L is the length of the longest N-gram obtained.

Figure 7:
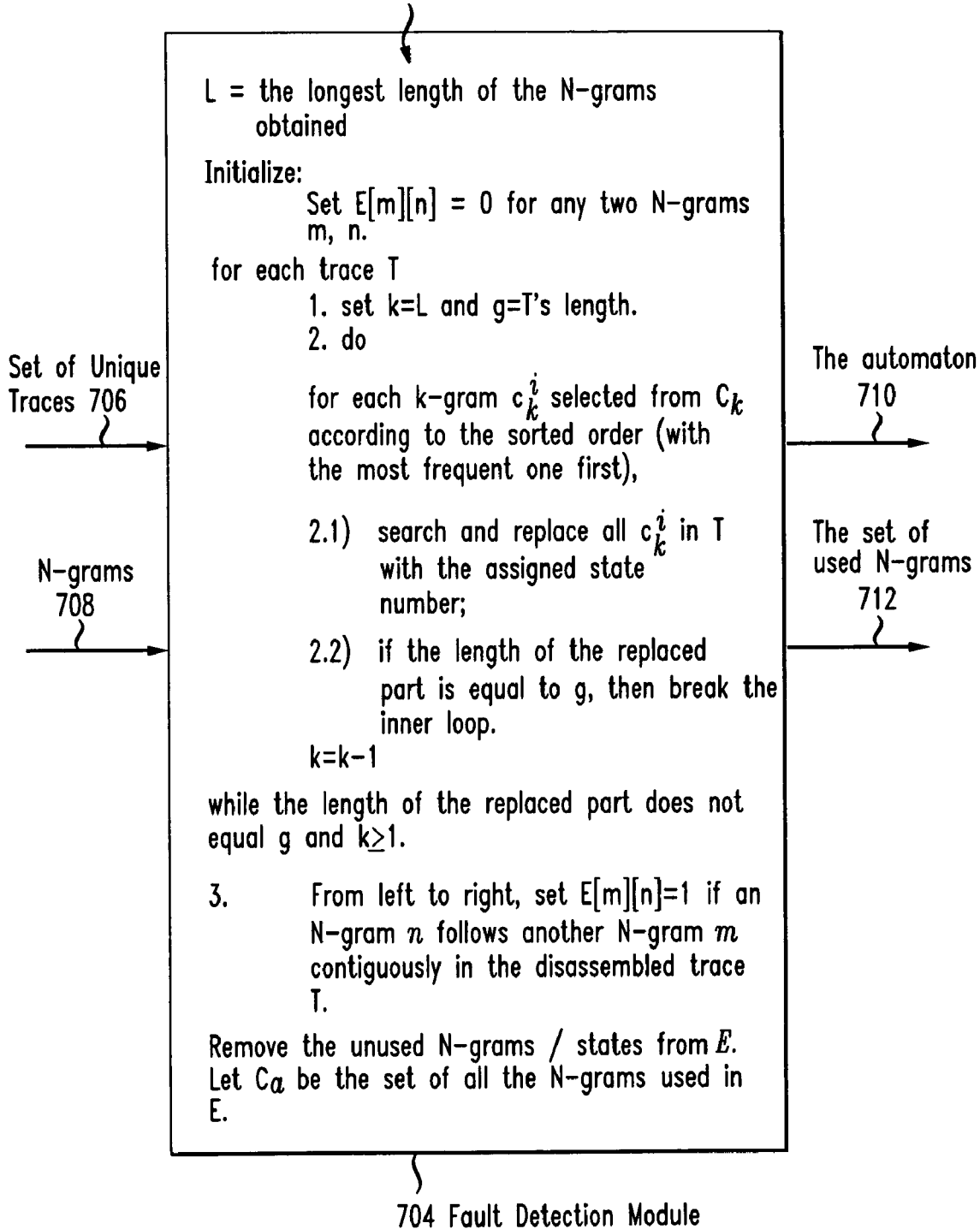
FIG. 7 shows a block diagram of a fault detection module executing an automata construction algorithm in accordance with an embodiment of the invention.

FIG. 7 shows an algorithm 700 that fault detection module 704 performs to generate the automata 312. The fault detection module 704 receives as inputs the set of unique traces 706 and the sets of N-grams 708. The fault detection module 704 performs the algorithm to generate one or more automata 710 to model the traces 706. The output produced by the fault detection module 704 is therefore the automata 710 and the set of used N-grams 712.

In particular, the fault detection module 704 initializes an array, E[m][n]=0 for any two N-grams m, n. Then, for each trace T, the fault detection module 704 sets a variable k equal to the longest length of the N-grams obtained (from the pool of N-grams). The fault detection module 704 also sets a variable l=T's length. For each k-gram $c_k^i$ selected from a set $C_k$ according to the sorted order (with the most frequent one first), the fault detection module 704 then searches and replaces all $c_k^i$ in T with the assigned state number (i.e., a number is assigned to represent $c_k^i$, in the automata where $c_k^i$ is a state). This process continues until the entire trace is disassembled into multiple varied-length N-grams. Edges are added to link consecutive N-grams in the disassembled trace to form automata 710. Unused N-grams are not included in the automata 710.

Figure 8:
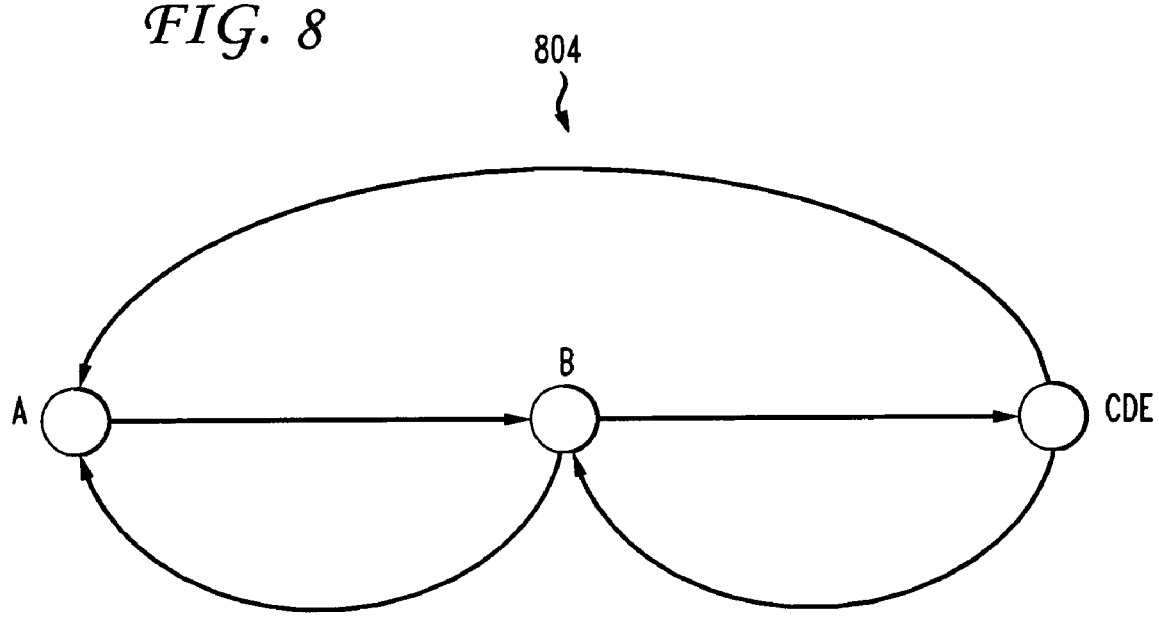
FIG. 8 shows a flow diagram of an automaton in accordance with an embodiment of the invention.

FIG. 8 illustrates an example of an automaton 804 that the fault detection module generates using the above algorithm for three traces, ABCDE, CDEA, and CDEBA. Based on the above algorithm, these three traces can be accurately represented in a single automata 804. Further, the automata 804 can also form additional traces, such as ABABA and CDEAB. Any trace that can be formed from an automata (e.g., automata 804) is considered to be a "normal" trace. If the fault detection module collects a trace that cannot be formed from the automata 804, then the trace is considered to be a faulty trace (i.e., an anomaly). Following the determination of a faulty trace, the faulty component can be located by correlating the dependency knowledge between traces and components. In one embodiment, suspicious segments of a faulty component may be determined based on the context of the faulty trace.

The ability of the created automata 804 to form additional traces is referred to below as generalization. Thus, automata 804 enables the creation of additional traces from paths of the automata 804 not used in the creation of the original traces (e.g., ABCDE, CDEA, and CDEBA are the three original traces, but the traces ABABA and CDEAB can also be created from the automata 804). The fault detection module constructs an automata that can represent traces not seen and included in the training set.

By the built-in generalization of the automata 804, the fault detection module potentially reduces the number of false positives (i.e., the number of traces that the fault detection module may classify as a "fault" that should instead by classified as "normal"). For example, in FIG. 8, CDEA is a normal trace even though this trace is not in the original traces used to create the automata 804. Thus, through the generalization enabled by the automata 804, the fault detection module prevents classifying CDEA as a fault when it is a normal trace that is formed by the automata 804.

Referring again to FIG. 7, the fault detection module 704 may use the threshold α to control the generalization capacity of automata 710. The threshold α determines the length of N-grams in the N-gram defining algorithm 500 and the length of N-gram further controls the generalization capacity of automata 710. For example, as α→1, most of the extracted N-grams are uni-grams and the automata has the maximum generalization capacity. Conversely, as α→0, the extracted, longest N-grams are the whole traces in the training set and the automata do not have any generalization capacity. Following the first rule above (to choose the longest N-gram), the fault detection module 704 tries to link entire traces with the smallest number of N-grams and edges. The second rule implies that the more frequent an N-gram is in the past (in the training set), the higher preference it is given for selection in representing the current trace also.

The fault detection module 704 does not use every N-gram to construct the automata 710. If the threshold a is small, then a small percentage of N-grams (long N-grams) are used in the automata 710. The unused N-grams are removed from the matrix E.

Also referring again to FIGS. 3 and 4, once the fault detection module constructs the automata 312, the offline learning stage 302 is complete and the online detection stage 304 begins. The server receives a user request in step 408. Upon the receipt of the request, the fault detection module generates a new trace (e.g., new trace 318 in FIG. 3) in step 410. The fault detection module then compares, in step 412, the new trace 318 with traces generated by the automata 312.

The fault detection module 122 may determine that the new trace 318 is a faulty trace for one of two reasons. The fault detection module 122 first determines whether the new trace 318 can be represented by N-grams used in the automata 312. If not, the fault detection module regards the new trace 318 as a faulty one. Alternatively, the fault detection module 122 determines whether edges 314 exist to allow a parse of the new trace 318 in the automata 312.

Figure 9:
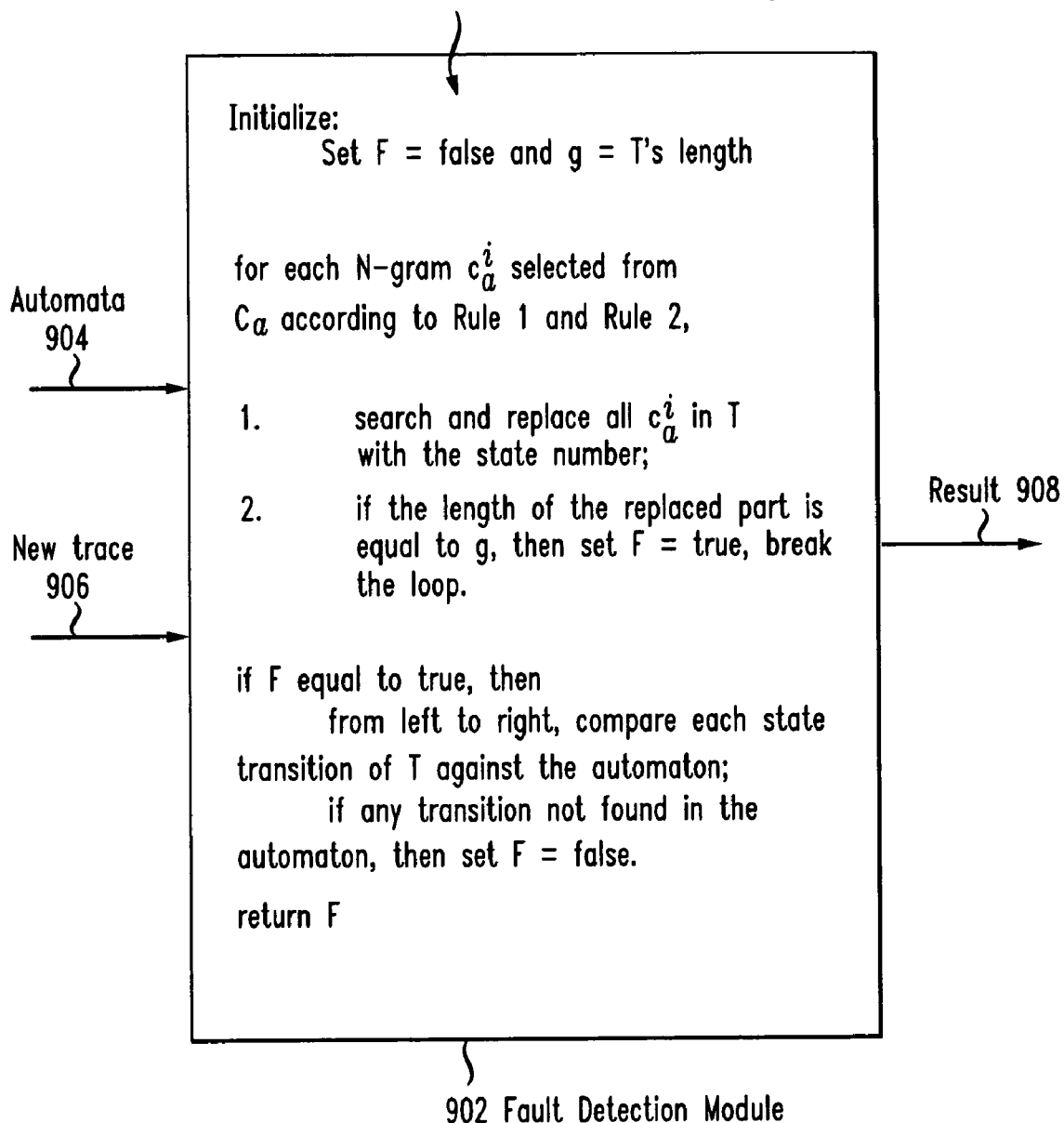
FIG. 9 shows a block diagram of a fault detection module executing a deterministic detection algorithm in accordance with an embodiment of the invention.

Also referring to FIG. 9, the fault detection module 902 performs the algorithm 900 shown to determine whether to reject the new trace 318, thereby classifying the new trace 318 as an anomaly. In particular, the fault detection module 902 compares each trace (i.e., the components themselves and the order of the components) against the automaton 904 to determine whether the trace can be generated from the automaton 904. The result 908 is a Boolean value denoting whether the new trace 906 is an anomaly. The algorithm, therefore, checks whether a new trace can be interpreted as a specific state sequence in the automata.

Figure 10:
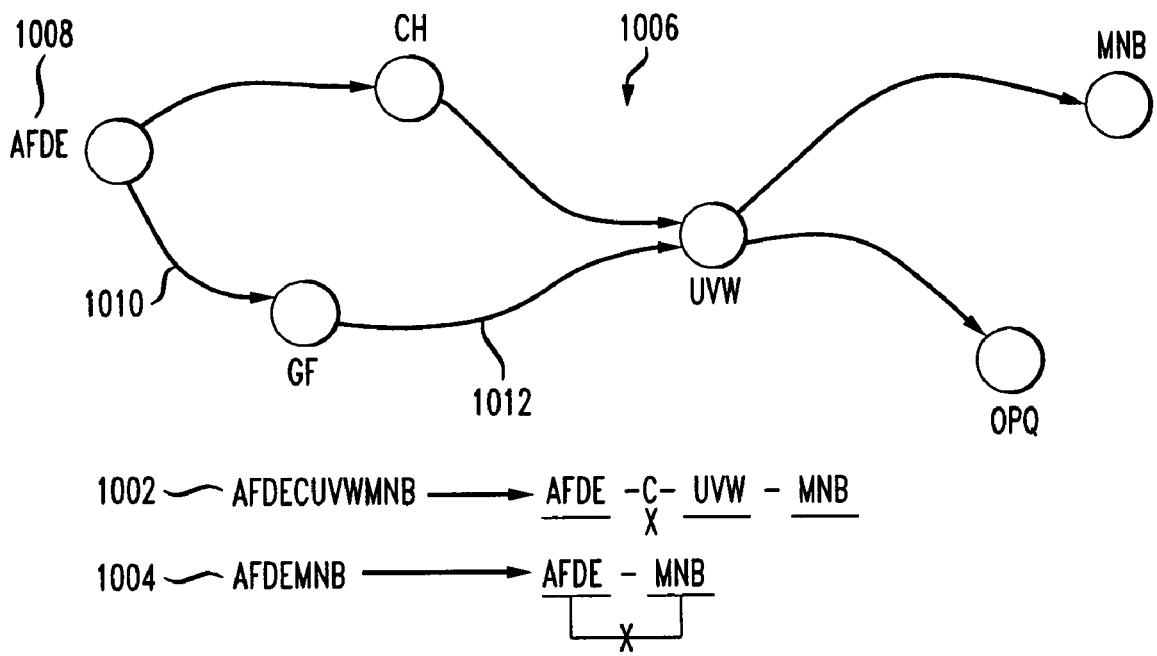
FIG. 10 shows a flow diagram of an automata and abnormal traces in accordance with an embodiment of the invention.

FIG. 10 shows an example of two traces 1002, 1004 that the fault detection module receives and rejects based on an automaton 1006. In particular, the automaton 1006 is made up of N-grams AFDE, CH, GF, UVW, MNB, and OPQ and can form traces from multiple combinations of these N-grams. For example, the automaton 1006 represents trace AFDE-CH-UVW-OPQ as well as trace AFDE-GF-UVW-MNB.

The fault detection module receives trace 1002 as input and analyzes the trace 1002 using the automaton 1006. The fault detection module determines that N-gram AFDE is the first N-gram in the trace 1002 as well as the automaton 1002. The fault detection module determines that C is present in the trace 1002 and recognizes that C, by itself, is not present in the automaton 1006. Although the rest of the trace 1002 can be represented with the N-grams in the automaton 1006, the trace 1002 is considered as a faulty trace because trace 1002 violates the first condition above. In particular, the automaton 1006 cannot generate the trace 1002 using the available N-grams (e.g., N-gram 1008) and edges (e.g., edges 1010, 1012).

As a second example, the fault detection module receives and analyzes trace 1004 (i.e., AFDEMNB). The fault detection module determines that N-grams AFDE and MNB are present in the automaton 1006. The fault detection module also determines, however, that no edge exists to allow a parse of the trace 1004 in the automaton 1006. Thus, the automaton 1006 does not have a direct path from AFDE to MNB and, therefore, trace 1004 is an anomaly.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting faults in a computer system comprising:
   receiving a request;
   generating a trace based on said request, said trace comprising a sequence of components used to service said request; and
   comparing said trace with a stored automaton describing a plurality of traces to determine whether said trace is an anomaly.

2. The method of claim 1 wherein said stored automaton further comprises N-grams.

3. The method of claim 2 wherein said stored automaton further comprises edges linking said N-grams.

4. The method of claim 3 wherein said comparing further comprises determining whether N-grams exist in said automaton to form said trace.

5. The method of claim 4 further comprising determining whether at least one path exists to link said N-grams to form said trace.

6. The method of claim 1 wherein determining that said trace is an anomaly further comprises determining that said trace is not formed by said automaton.

7. The method of claim 1 wherein said stored automaton describes a plurality of prior traces.

8. A method for detecting faults in a computer system comprising:
   storing a plurality of traces in a memory, each trace comprising a sequence of components used to service requests;
   generating an automaton using at least one subset of component sequences; and
   storing said automaton in a memory.

9. The method of claim 8 further comprising defining at least one subset of component sequences from said plurality of traces.

10. The method of claim 8 wherein said at least one subset of component sequences occurs more than a predetermined threshold number of times in said plurality of traces.

11. The method of claim 8 further comprising controlling a length of said at least one subset of component sequences.

12. The method of claim 8 wherein said generating of said automaton further comprises linking said at least one subset of component sequences with edges.

13. The method of claim 12 further comprising generating a new trace based on a received user request.

14. The method of claim 13 further comprising comparing said new trace with said automaton to determine if said new trace is an anomaly.

15. An apparatus for detecting faults in a computer system comprising:
   means for receiving a request;
   means for generating a trace based on said request, said trace comprising a sequence of components used to service said request; and
   means for comparing said trace with a stored automaton describing a plurality of traces to determine whether said trace is an anomaly.

16. An apparatus for detecting faults in a computer system comprising:
- means for storing a plurality of traces in a memory, each trace comprising a sequence of components used to service requests;
- means for generating an automaton using at least one subset of component sequences; and
- means for storing said automaton in a memory.

17. The apparatus of claim 16 further comprising means for defining said at least one subset of component sequences from said plurality of traces.

18. The apparatus of claim 15 wherein said stored automaton further comprises N-grams.

19. The apparatus of claim 18 wherein said stored automaton further comprises edges linking said N-grams.

20. The apparatus of claim 19 wherein said means for comparing said trace further comprises means for determining whether N-grams exist in said automaton to form said trace.

21. The apparatus of claim 20 further comprising means for determining whether at least one path exists to link said N-grams to form said trace.

22. The apparatus of claim 15 wherein means for comparing further comprises means for determining that said trace is not formed by said automaton.

23. The apparatus of claim 15 wherein said stored automaton describes a plurality of prior traces.

24. The apparatus of claim 16 wherein said at least one subset of component sequences occurs more than a predetermined threshold number of times in said plurality of traces.

25. The apparatus of claim 16 further comprising means for controlling a length of said at least one subset of component sequences.

26. The apparatus of claim 16 wherein said means for generating an automaton further comprises means for linking said at least one subset of component sequences with edges.

27. The apparatus of claim 26 further comprising means for generating a new trace based on a received user request.

28. The apparatus of claim 27 further comprising means for comparing said new trace with said automaton to determine if said new trace is an anomaly.

* * * * *